April 10, 1951 — E. G. RAGATZ — 2,548,058
RICH OIL DISTILLATION
Filed July 28, 1947
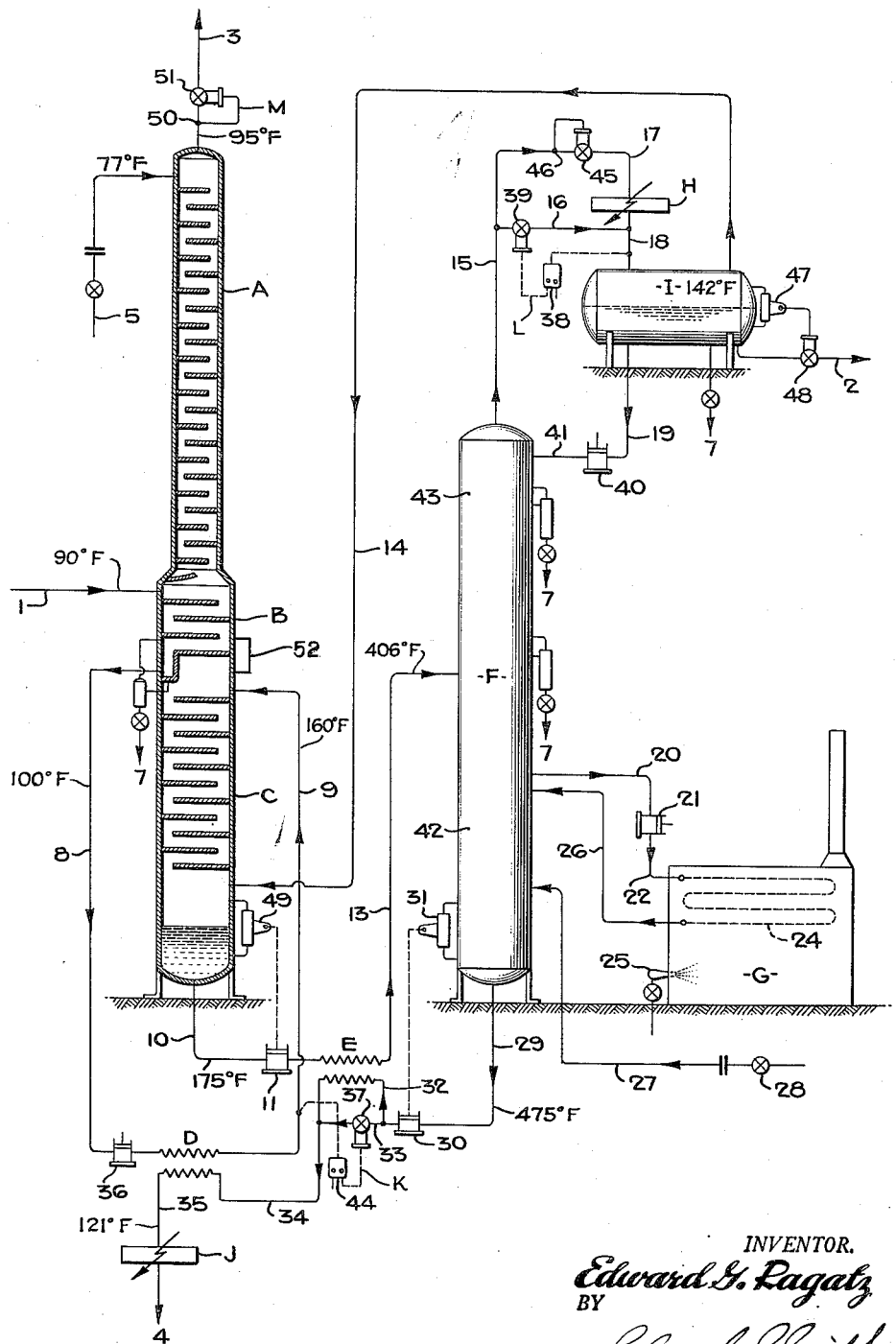
INVENTOR.
Edward G. Ragatz
BY
Claude E. Swift
ATTORNEY Patented Apr. 10, 1951

2,548,058

UNITED STATES PATENT OFFICE 2,548,058

RICH OIL DISTILLATION

Edward G. Ragatz, San Marino, Calif.

Application July 28, 1947, Serial No. 764,034

4 Claims. (Cl. 196—8)

This invention relates to a method of recovering a high yield of valuable light hydrocarbons from a heavy oil fraction containing the same. More specifically, the invention relates to a method and apparatus for fractionating undesirable from desirable light hydrocarbon constituents contained in an absorption oil.

Increased propane demands are calling for steadily increased percentage recovery and retention of propane at natural gasoline absorption plants. Unfortunately, high percentage absorption recoveries of desirable propane in the absorption operation entails correspondingly high recoveries of undesirable ethane, with the resultant problem of subsequent economical elimination of ethane without serious loss of initially recovered propane.

Many different process cycles have been employed for this ethane-propane separation. Experience with such cycles clearly indicates that prefractionation of the rich oil, rather than extensive recycling and reabsorption of "flashed" rich vapors, offers the best solution to the ethane elimination problem. To date such prefractionation has normally taken some form of either:

1. Utilization of lean gas from a primary absorber, or recycled vapors from a high-pressure wild gasoline accumulator, as the stripping agent at a simple rich oil stripping tray section located in the bottom of a reabsorber.

2. Conventional "reboil" heating of the rich oil at the base of a combination reabsorber and rich oil rectifying column.

Of these two operations, the first is only partially effective in sharply separating ethane from propane without excessive loss of propane, and often requires the use of an expensive compression operation for the handling of the stripping vapors; while the second uses an excessive amount of heat for its operation, and can only be adapted with difficulty to the handling of absorption products from lean wet gases.

In my new process, outlined hereinafter, I have avoided the weaknesses of these two conventional systems, and provided a selective ethane removal cycle in which:

1. The products from lean wet gases can be just as readily handled as from rich wet gases.

2. High propane retentions (85% to 95%) are obtained on the propane recovered in the absorption oil at the primary absorbers.

3. The ethane content of the rich oil stripping still condensate is readily reduced to a specification acceptable concentration.

4. The lean gas discarded from the rich oil de-ethanizing column is cut direct to fuel gas without further reabsorption.

5. Heat for the de-ethanizing column operation is obtained solely by interchange with hot lean oil from the main stripping still.

6. The hot lean oil from the main stripping still is cooled by rich oil interchange to a temperature closely approaching (25° F. plus or minus) that of the rich oil leaving the main absorbers.

7. The quantity of lean oil circulated over the reabsorption section of the de-ethanizing column is held to a minimum.

8. Compression of stripping vapors for the de-ethanizer is avoided.

The above desirable objectives are obtained by the use of the following new and unique process combinations:

1. A rectifying operation is carried out on the absorbed product at a controlled elevated temperature in the presence of absorption oil, utilizing rectifying vapors from an equilibrium flash separation of said absorbed product at an independently controlled temperature in the absence of said absorption oil.

2. The controlled heating of the rich absorption oil at said rectifying column is effected at a tray intermediate the rich oil feed tray and the bottom rectifying tray.

3. Vapors leaving said absorbed product rectifying column are subjected to reabsorption.

A preferred embodiment of my invention is described on the accompanying process flow sheet in which the main rich oil de-ethanizing column is shown with its three primary sections:

"A" (Re-absorber section),

"B" (Cool rich oil rectifying section), and

"C" (Hot rich oil rectifying section).

"D" is the rich oil-lean oil interchanger used to heat the hot rectifying section of the de-ethanizer.

"E" is a second interchanger used to further heat the rich oil after leaving the de-ethanizer rectifying section.

"F" is a conventional rich oil stripping still utilizing side-recirculation heating via a fired heater.

"G" is a directed fired heater to heat a side draw-off stream of rich absorption oil for introduction of heat into the main rich oil stripping still.

"H" is the overhead condenser for the main stripping still.

"I" is the stripping still overhead accumulator in which the net stripping still liquid product is separated from recycled rectifying vapors.

"J" is a final water cooler on the cooled lean oil.

"K" is a temperature controlled by-pass around the high temperature interchanger utilized to maintain an accurately controlled stripping temperature in rich fat oil de-ethanizer.

"L" is a temperature controlled by-pass around the main stripping still condenser utilized to maintain an accurate temperature control on the liquid in receiver I.

With this process flow sheet, cool rich oil stream 1 is fed to the top of cool stripping section B of the rich oil de-ethanizer, and stripping steam stream 27 is fed to the bottom of the main rich oil stripping still with a resultant production of:

Stream 2.—A combined absorbed product ready for splitting into specification cuts at an appropriate fractionation column without further production or discard of recycled vapors.

Stream 3.—Fuel gas substantially free of desired products.

Stream 4.—Lean oil from water coolers ready for recirculation at the absorbers.

Stream 7.—Streams of water which accumulate at various strategic positions in the system and must be bled therefrom.

Referring more specifically to the drawing, cold rich absorption oil is introduced via line 1 onto the top tray of the cool de-ethanizer rectifying section B. The cold oil thus introduced onto the top tray of section B flows downward and is withdrawn via line 8 and passes through pump 36 to heat exchanger D where it picks up heat from the hot lean absorption oil introduced into heat exchanger D via line 34. From heat exchanger D the heated rich absorption oil passes via line 9 back into the hot rich oil rectifying section C. The heated absorption oil reintroduced via line 9 into the rectifying section C passes downwardly and is finally withdrawn through line 10.

As the rich absorption oil passes downwardly through the cool rectifying section B into the hot rectifying section C it is countercurrently contacted with rectifying gas introduced below the bottom tray of hot rectifying section C by line 14. This rectifying gas passes upwardly through section C thence into section B as through line 52 and thence it passes into section A, which is a re-absorption section into which cooled lean oil is introduced via line 5 near the top of this section. This cooled lean absorption oil in passing downwardly over the plates in section A absorbs the heavier constituents of the gas passing upwardly through this section. The cooled lean oil in section A passes out of the bottom of section A and upon the feed tray of the rectifying section B where it commingles with the cool rich oil introduced via line 1. From the top of the re-absorption section A unabsorbed gases are vented via line 3. Valve 51 in line 3 is controlled by mechanism 50. In the drawing, the re-absorption section A is shown as an integral part of sections B and C. This is only shown in this manner as a matter of convenience. If desired, section A could be a separate column into which the gases from section B are countercurrently contacted with cold lean absorption oil introduced via line 5, and the cool absorption oil taken off the bottom of the column of section A could satisfactorily be introduced into line 1 for feeding into the cool rectifying section B.

From the bottom of the hot rectifying section C, the absorption oil with its dissolved fractions passes into heat exchanger E where it is heat exchanged against the hot lean absorption oil withdrawn from the main rich oil stripping still via lines 29 and 32. Level control 49 actuates the pump 11 and maintains a substantially constant liquid level in the bottom of the rectifying column. In heat exchanger E the absorption oil with its dissolved fractions picks up energy in the form of heat from the hot lean absorption oil and then passes via line 13 into an intermediate point of the main rich oil still F. As shown on the diagram, the amount of hot lean absorption oil passing through the heat exchanger E can be regulated by by-pass line 33 and valve 37 to maintain the desired temperature in rectifying section C.

The lower section 42 of still F is a stripping zone in which steam is used to strip the low boiling constituents from the absorption oil, and the latter is withdrawn from the still via line 29. The upper section 43 of still F is a fractionating zone in which the vapors stripped from the absorption oil in zone 42 of F are fractionated prior to passage to condenser H.

Stripping steam is introduced via valve 28 and line 27 into the lower section of still F. At a point below the entrance of line 13 into still F a side draw-off stream of rich oil is taken through line 20, pump 21 and line 22 into the direct fired heater G equipped with heating coil 24. Heat is introduced into the heater G by means of burner 25. The heated rich oil is then returned to the rich oil column F via line 26. The stripped lean oil is withdrawn from still F via line 29 and pump 30 which is controlled by the liquid level device 31, from whence it passes either through line 32 or line 33, as previously described.

The vapors withdrawn from still F pass via line 15 through valve 45 controlled by mechanism 46 into condenser H where a portion of the vapors are condensed. The vapor-liquid mixture in condenser H then passes via line 18 into the accumulator I. The temperature of the vapor-liquid stream in line 18 is carefully controlled by means of temperature control device 38 which is connected into line 18 and controls valve 39 whereby an increasing or decreasing amount of vapors may be by-passed around condenser H via line 16 into line 18 to control the temperature of the mixed vapor-liquid stream entering accumulator I. This is what is referred to in the claims as the "equilibrium flash zone."

From accumulator I vapors are withdrawn via line 14 for recycling into the rectifying section C of the rich oil de-ethanizer. From the bottom of the accumulator I reflux liquid is withdrawn through line 19 and passes via pump 40, and line 41, back into the rectifying zone 43 of still F. Any water accumulating in the bottom of accumulator I is withdrawn from this vessel via line 7. The final de-ethanized absorbed product is withdrawn from accumulator I through line 2. The valve 48 in line 2 is controlled by liquid level device 47.

Equilibrium flash zone accumulator I and de-ethanizer sections A, B, and C, are held at a substantially constant pressure by back pressure regulator M.

With the pressure thus held substantially constant on the rectifying system, the temperatures at equilibrium flash zone I and rectifying section C are individually adjusted and controlled so that:

1. The volume of vapors required for an effective rectification action at section C are carried out as a liquid in the absorber oil leaving section C, and rejected as a vapor at equilibrium flash section I for subsequent return to section C.

2. The rectified "cut" at section C resulting from this recycling vapor flow is effected between undesirable ethane and lighter, and desirable propane and heavier fractions.

3. The equilibrium liquid remaining at I is of desired final specification quality.

As a result of this control, undesired ethane and lighter fractions are rejected as vapors from the top of section B. These vapors carry with them a substantial volume of desired propane and heavier fractions, which fractions are subsequently recovered in reabsorber section A.

As a specific example of my process, cool rich absorption oil at a temperature of 90° F. is introduced into rectifying section B of the rich oil de-ethanizer column via line 1 which is maintained at about 75 pounds pressure (gauge). From line 8 absorption oil (100° F.) containing partially rectified constituents is passed into heat exchanger D and returned via line 9 to the hot rectifying section C of the rich oil de-ethanizer at a temperature of about 160° F. From the bottom of the rich oil de-ethanizer hot rich absorption oil at 175° F. is withdrawn via line 10 and passes through heat exchanger E and line 13 into still F where it enters at a temperature of about 406° F. Hot stripped lean oil is withdrawn from still F via line 29 at a temperature of about 475° F. The vapors ascending in still F from the stripping section 42 pass into the rectifying section 43 of still F where they are countercurrently contacted with liquid reflux introduced into the upper zone of rectifying section 43. The vapors withdrawn from line 15 pass through condenser H and thence into accumulator I where a temperature is maintained at about 142° F. Reflux liquid is withdrawn from accumulator I via line 19, passes through pump 40 and line 41 into the upper section of F at a temperature corresponding to the temperature of the liquid in I. Likewise, the vapors passing from accumulator I to the lower portion of the hot rectifying section C of the rich oil de-ethanizer are at the same temperature as the liquid in accumulator I. From the bottom of the stripping still F lean oil is withdrawn at a temperature of 475° F. After passing through heat exchangers E and D the lean oil in line 35 enters the water cooler J at a temperature of about 121° F.

I claim:

1. The method of separately removing undesirable low boiling hydrocarbons and desired higher boiling hydrocarbons from rich absorption oil, that includes passing said oil downwardly through a plurality of trays in a cooler rectifying zone, passing rich oil from the bottom of said zone through a heat exchange zone and then downwardly through a warmer rectifying zone, heating the rectified rich oil taken from the bottom of said warmer rectifying zone and vaporizing absorbed hydrocarbons from said rectified oil, introducing a lower molecular weight portion of said vaporized hydrocarbons into said warmer rectifying zone for upward flow therein, passing vapors from said warmer rectifying zone upwardly through the trays of said cooler rectifying zone in contact with the rich oil flowing downwardly therethrough, passing vapors from said cooler rectifying zone upwardly through an absorption zone, introducing lean absorption oil to the top of said absorption zone and passing that oil downwardly through said absorption and rectifying zones in contact with the rising vapors therein, removing low boiling undesirable hydrocarbons from the top of said absorption zone, and passing hot lean oil resulting from heating of said rectified rich oil through said heat exchange zone in indirect heat exchange relation with the rich oil passing therethrough.

2. The method of separately removing undesirable low boiling hydrocarbons and desired higher boiling hydrocarbons from rich absorption oil, that includes passing said oil downwardly through a plurality of trays in a cooler rectifying zone, passing rich oil from the bottom of said zone through a heat exchange zone and then downwardly through a warmer rectifying zone, heating the rectified rich oil taken from the bottom of said warmer rectifying zone and vaporizing absorbed hydrocarbons from said rectified oil, introducing a lower molecular weight portion of said vaporized hydrocarbons into said warmer rectifying zone for upward flow therein, passing vapors from said warmer rectifying zone upwardly through the trays of said cooler rectifying zone in contact with the rich oil flowing downwardly therethrough, passing vapors from said cooler rectifying zone upwardly through an absorption zone, introducing lean absorption oil to the top of said absorption zone and passing that oil downwardly through said absorption and rectifying zones in contact with the rising vapors therein, removing low boiling undesirable hydrocarbons from the top of said absorption zone, and passing hot lean oil resulting from heating of said rectified rich oil in indirect heat exchange relation with the oil flowing from said warmer rectifying zone and also through said heat exchange zone in indirect heat exchange relation with the rich oil passing therethrough.

3. The method of separately removing undesirable low boiling hydrocarbons and desired higher boiling hydrocarbons from rich absorption oil, that includes passing said oil downwardly through a plurality of trays in a cooler rectifying zone, passing rich oil from the bottom of said zone through a heat exchange zone and then downwardly through a warmer rectifying zone, heating the rectified rich oil taken from the bottom of said warmer rectifying zone and vaporizing absorbed hydrocarbons from said rectified oil, subjecting resulting vapors to partial condensation and introducing remaining uncondensed vapors into said warmer rectifying zone for upward flow therein, passing vapors from said warmer rectifying zone upwardly through the trays of said cooler rectifying zone in contact with the rich oil flowing downwardly therethrough, passing vapors from said cooler rectifying zone upwardly through an absorption zone, introducing lean absorption oil to the top of said absorption zone and passing that oil downwardly through said absorption and rectifying zones in contact with the rising vapors therein, removing low boiling undesirable hydrocarbons from the top of said absorption zone and passing hot lean oil resulting from heating of said rectified rich oil through said heat exchange zone in indirect heat exchange relation with the rich oil passing therethrough.

4. The method of separately removing undesirable low boiling hydrocarbons and desired higher boiling hydrocarbons from rich absorption oil, that includes passing said oil downwardly through a plurality of trays in a cooler rectifying zone, passing rich oil from the bottom of said zone through a heat exchange zone and then downwardly through a warmer rectifying zone, passing a stream of the rectified rich oil from the bottom of said warmer rectifying zone into and within a still zone and heating said stream to vaporize absorbed hydrocarbons from the oil, removing and partially condensing vaporized hydrocarbons from said still zone, introducing remaining uncondensed vapors into said warmer rectifying zone for upward flow therein, passing vapors from said warmer rectifying zone upwardly through the trays of said cooler rectifying zone in contact with the rich oil flowing downwardly therethrough, passing vapors from said cooler rectifying zone upwardly through an absorption zone, introducing lean absorption oil to the top of said absorption zone and passing that oil downwardly through said absorption and rectifying zones in contact with the rising vapors therein, removing undesirable low boiling hydrocarbons from the top of said absorption zone, and passing hot lean oil from said still zone in indirect heat exchange relation with both said rectified oil stream and the rich oil flowing through said heat exchange zone.

EDWARD G. RAGATZ.

REFERENCES CITED

The following references are of record in the file of this patent:

UNITED STATES PATENTS

| Number | Name | Date |
|---|---|---|
| 1,789,470 | Loomis | Jan. 20, 1931 |
| 2,134,836 | Ostergaard | Nov. 1, 1938 |
| 2,249,885 | Carney | July 22, 1941 |
| 2,290,957 | Hachmuth | July 28, 1942 |
| 2,337,254 | Legatski et al. | Dec. 21, 1943 |
| 2,345,934 | Gregory | Apr. 4, 1944 |
| 2,369,058 | Legatski | Feb. 6, 1945 |
| 2,388,732 | Finsterbusch | Nov. 13, 1945 |
| 2,468,750 | Gudenrath | May 3, 1949 |